No. 894,588. PATENTED JULY 28, 1908.
E. R. BRODTON.
HYDRAULIC PUMPING AND GENERATING APPARATUS.
APPLICATION FILED AUG. 23, 1907.
3 SHEETS—SHEET 2.
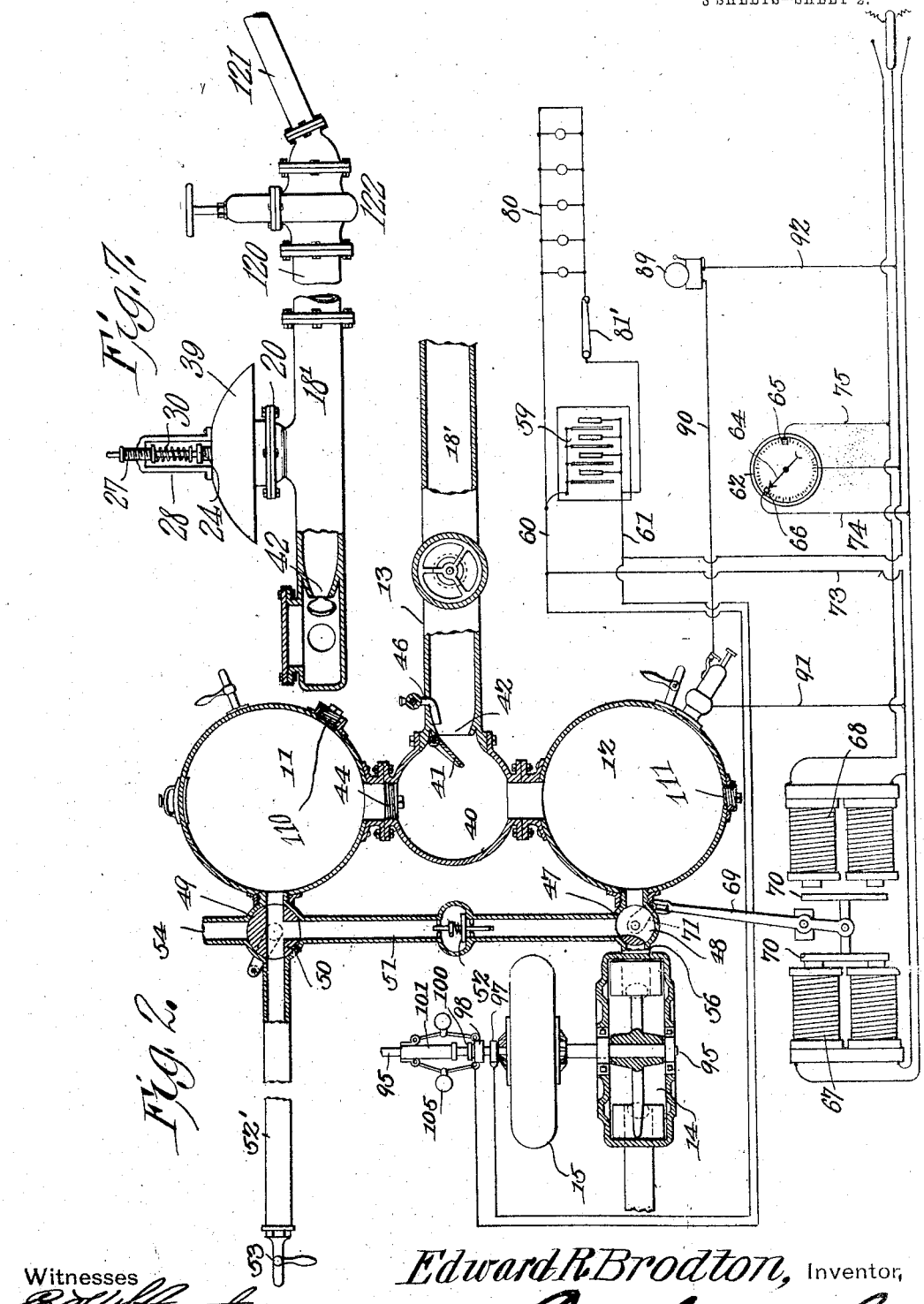
Witnesses
Edward R. Brodton, Inventor,
by
Attorneys No. 894,588. PATENTED JULY 28, 1908.
E. R. BRODTON.
HYDRAULIC PUMPING AND GENERATING APPARATUS.
APPLICATION FILED AUG. 23, 1907.
3 SHEETS—SHEET 3.
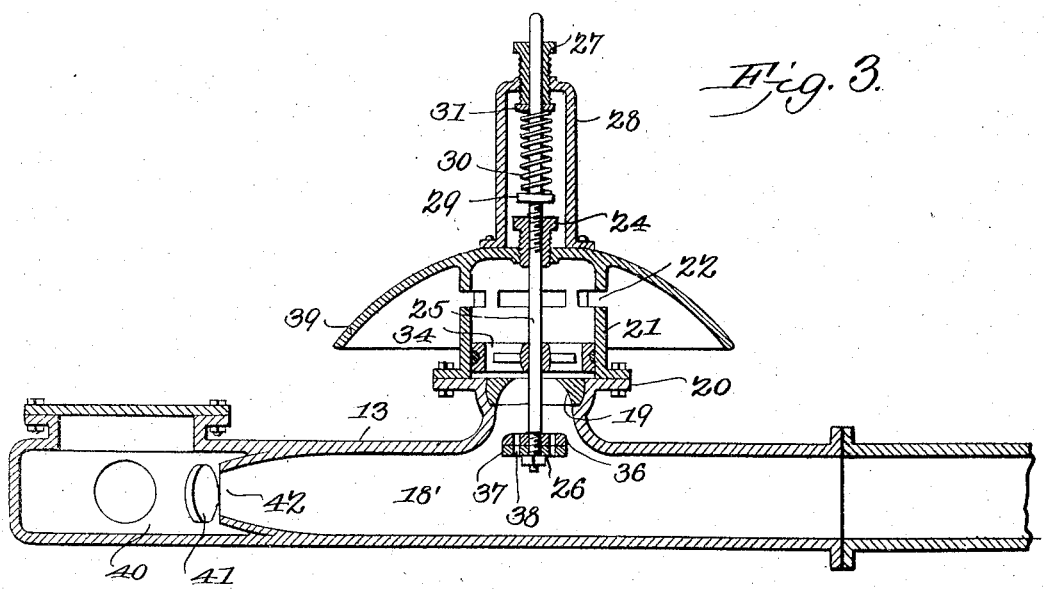
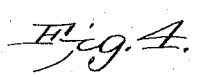
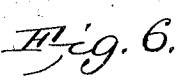
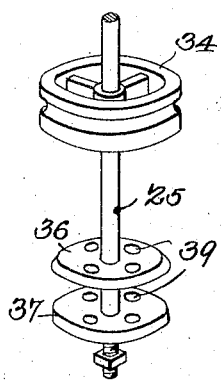
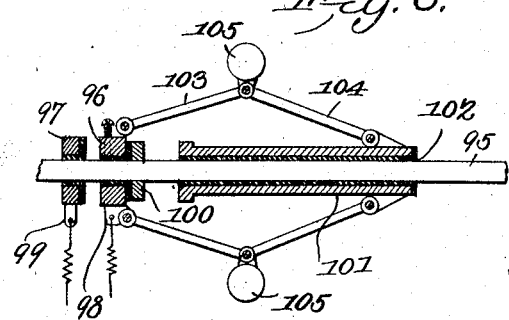
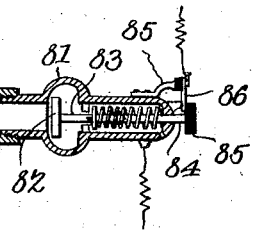
Witnesses
Edward R. Brodton,
Inventor.
by
Attorneys

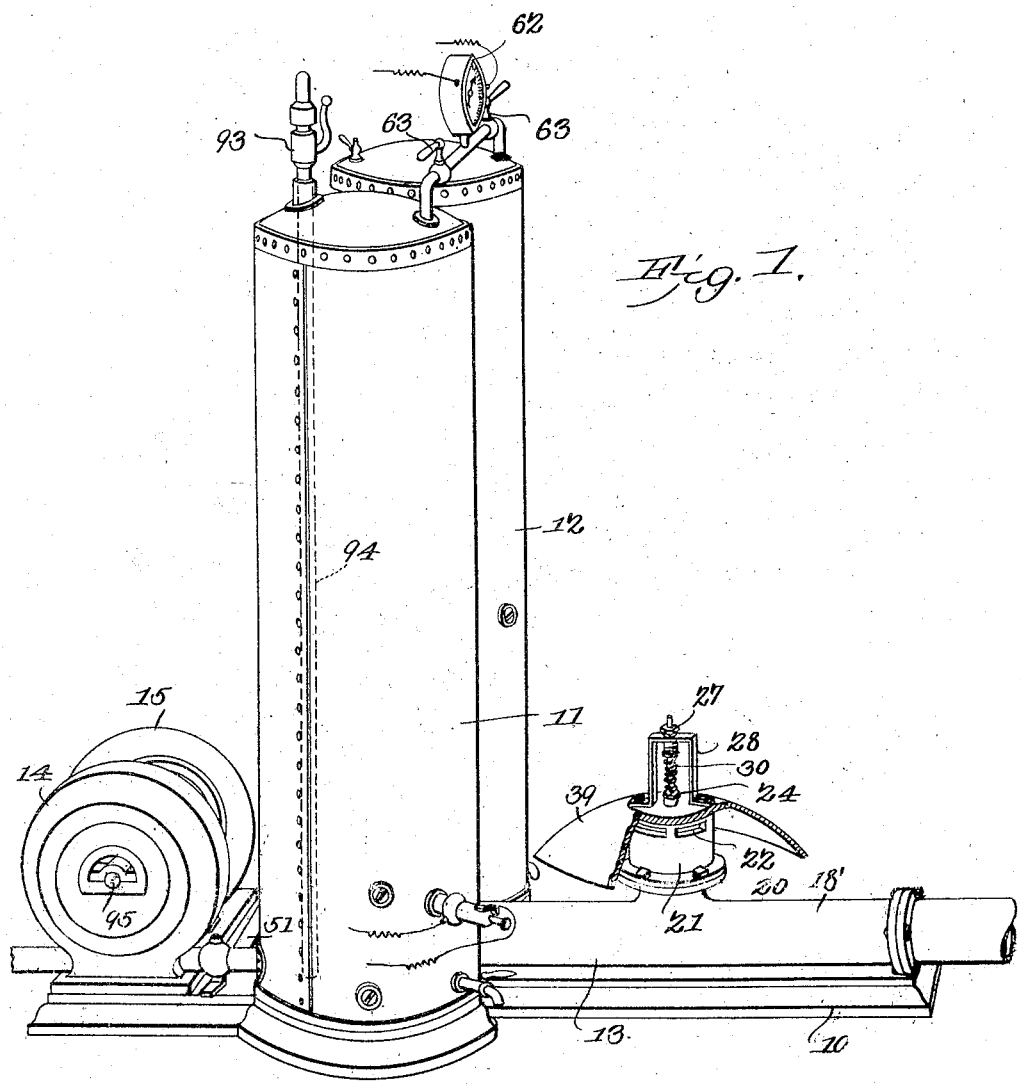

UNITED STATES PATENT OFFICE.

EDWARD ROBERT BRODTON, OF MOBILE, ALABAMA, ASSIGNOR OF THIRTEEN-SIXTEENTHS TO G. H. FONDE AND E. E. WAGAR, OF MOBILE, ALABAMA.

HYDRAULIC PUMPING AND GENERATING APPARATUS.

No. 894,588.  Specification of Letters Patent.  Patented July 28, 1908.

Application filed August 23, 1907. Serial No. 389,902.

*To all whom it may concern:*

Be it known that I, EDWARD ROBERT BRODTON, a citizen of the United States, residing at Mobile, in the county of Mobile and State of Alabama, have invented a new and useful Hydraulic Pumping and Generating Apparatus, of which the following is a specification.

This invention relates to hydraulic apparatus and has for its principal object to provide means for utilizing the force of running streams, wells, springs or other bodies of water for pumping, power, lighting, and other purposes.

A further object of the invention is to provide an apparatus which may be placed at any convenient point, and which will operate without care or attention for the purpose of supplying water to a farmhouse, barn or other structure, and for generating electrical power which may be utilized for lighting purposes, or for the running of machinery of any character, a further object in this connection being to provide a mechanism that may be controlled from a distance in case it is desired to employ all the energy for the pumping of water, or for generating current.

A still further object of the invention is to provide a machine of this type which may be readily adjusted in accordance with the head of water, and which is so arranged that it may be employed for the purpose of compressing air, or for other purposes when necessary.

A still further object of the invention is to provide a power apparatus of this type in which the magneto generator or dynamo is driven by water power, and is connected to a storage battery, so that the battery may be charged during the day hours and utilized at night for lighting purposes, and to employ means for automatically connecting and disconnecting the battery circuit as the generator starts and stops.

A still further object of the invention is to provide an apparatus of this type in which the machine will first operate until water is stored under pressure until the pressure reaches a predetermined point, and then is automatically directed through, or into engagement with the mechanism for operating the magneto generator or dynamo.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a perspective view of the principal portions of a hydraulic pumping and generating apparatus constructed in accordance with the invention, a portion of the escape valve casing being broken away to more clearly illustrate the construction. Fig. 2 is a sectional plan view of the apparatus showing also a diagram of the electrical connections. Fig. 3 is a sectional elevation of a portion of the apparatus on the line 3—3 of Fig. 2. Fig. 4 is a detail perspective view of the escape valve, showing the various parts thereof separated. Fig. 5 is a detail sectional view of a circuit closing device for causing the sounding of an alarm when the water pressure is lowered or the apparatus ceases to operate. Fig. 6 is a detail sectional view of the automatic circuit opening and closing device for controlling the connection between the magneto generator and the storage battery. Fig. 7 is a side elevation partly in section of a portion of the ram showing the water entrance connections.

Similar numerals of reference are employed to indicate corresponding parts throughout the several figures of the drawings.

The various parts of the apparatus are supported on a suitable bed or sole plate 10 and includes in general a pair of vertically disposed tanks 11—12, a hydraulic ram 13, a rotary impact motor 14, and a dynamo 15. The water which serves as the power element is directed from its source through a pipe 121, a suitable gate valve 122 being employed for the purpose of controlling the flow.

The stream of water first enters the water chamber 18' of the ram, this chamber being shown in the present instance as cylindrical in cross section, and at the top of this casing is arranged a valve seat 19 that is held in place by the flanged upper end 20 of the casing. To the flange 20 is bolted a casing 21 having water escape ports 22, and at the top of this casing is a threaded opening arranged for the reception of an adjustable sleeve 24, through which passes the stem 25 of an escape valve 26. The stem 25 also extends through a threaded sleeve 27 that is adjustably mounted in the upper end of a yoke 28 carried by the valve casing, and on the stem is a collar 29 which makes contact with the sleeve 24 and limits the downward movement of the valve, the adjustment of the sleeve 24 determining the stroke of the valve, and this stroke may be changed in accordance with the pressure or the head of water. The valve is normally held down in open position by a helical compression spring 30 arranged between the collar 29 and a washer 31, and said washer rests against the upper adjustable sleeve 27 which may be turned for the purpose of adjusting the stress of the spring.

The upper casing 21 is bored out and receives an annular valve 34 that is rigidly secured to the stem 25, and when the latter moves up with valve 26, the valve 34 will, also, be moved over the escape ports 22.

The escape valve operating member 26 is of such construction that it may be employed in connection with a current of water under any pressure. Where the pressure is low, there must be less opportunity for the water to escape, and where the pressure is high a comparatively large volume of water must escape at each operation. To meet the varying conditions, the valve operating member 26 is formed of a pair of superposed disks 36 and 37, each of which is provided with a number of openings 38. The disks may be adjusted circumferentially in order that the whole of the areas of the openings may be effective, or any portion of the area may be cut off in order to reduce the quantity of water passing through the valve operating member, or in some cases the disks may be turned to such an extent as to form a practically solid disk. Over the escape opening 21 is arranged a suitable hood or deflector 39 to direct the escaping water downward. At the end of the water chamber is a pressure chamber 40, communication between the two being controlled by a pivotally mounted valve 41 that is opened by the pressure of water from the chamber 18. In order to reduce the pressure tending to maintain the valve in closed position, the delivery end of the water chamber is contracted to form a nozzle like opening 42 which is closed by the valve, and the area of this opening, as well as the area of the valve, is much less than the pressure cross sectional area of the chamber 18', so that resistance to the opening movement of the valve is much less than would be the resistance to the opening of a valve of sufficient size to extend completely across said water chamber 18'.

On each side of the pressure chamber are the vertically arranged tanks 11 and 12, and the lower ends of these tanks are coupled to the pressure chamber, but under ordinary conditions one of these passages is closed by a removable plug 44, the other passage leading to the tank 12 being open.

Arranged at one side of the water chamber is a snifting valve 46 for the passage of air, as usual.

The lower portion of the tank 12 communicates with a valve chamber 47 in which is arranged a valve 48, and the lower portion of the tank 11 communicates with a valve chamber 49 in which is arranged a three-way valve 50. The two valve chambers are connected to each other by a transversely extending horizontal pipe 51 in which is a check valve 52, closing in the direction of the valve 48. Leading from the valve chamber 50 is a service pipe 52' extending to the house or other point to be supplied with water, and at the end of the pipe is a cock or faucet 53, through which the water may be drawn off, the area of the passage through the cock or faucet being considerably less than the area of the pipes. Leading from the valve chamber 49 is an air pipe through which the air may be discharged when the device is employed for compression of air. This valve is turned to the position shown in Fig. 2, and valve 48 occupies the position shown in the same figure, so that the water from the pressure chamber 40 passes into the tank 12, thence flows through the valve chamber 47, and pipe 51, past the check valve 52, through valve 50 to the tank 11, the latter serving as a storage tank for water under pressure, and the pipe 52' is thereafter filled with water under sufficient pressure to permit its discharge at a considerable distance above the level of the tanks. The apparatus may operate with the parts in the position shown, and a constant supply of water will be maintained in the tank 11.

At a point adjacent to the valve chamber 47 is an impact water motor 14 of any desired construction, and leading to the motor is a pipe 56, through which the water may pass when the valve 48 is turned to blank the pipe 51 the water from the tank 12 then passing directly to the motor casing, and the supply through pipe 51 being cut off.

At one side of the water motor is a magneto generator or dynamo 15 that is driven by the motor, the connection being shown direct in the present instance. When the dynamo is operating, the current generated is conducted to a storage battery 59, the circuit being completed through wires 60 and 61.

At the top of the two tanks 11 and 12 is a pressure gage 62 that is connected to the upper ends of both tanks, communication being governed by suitable valves 63. The pressure gage is provided with a movable hand or pointer 64 which may be arranged to engage a pair of contacts 65 and 66 carried by the gage and preferably adjustable. When the pressure increases to a predetermined point, the hand 64 will engage the contact 65 and when the pressure decreases to a certain point the hand will engage the contact 66, and these contacts form the terminals of an electrical circuit which governs the position of the valve 48.

At a point adjacent to the valve 48 are two electro-magnets 67 and 68, and between them is pivoted a lever 69 carrying a pair of armatures 70 that are disposed within the field of force of said electro-magnets. The lever is connected to an arm 71 that is secured to the stem of the pipe 48, and the relative arrangement of the parts is such that when the electro-magnet 67 is energized, as shown in Fig. 2, the valve is in position to cut off the flow of water to the motor. When the electro-magnet 68 is energized, however, the valve will be shifted to cut off the flow of water to the tank 11 and allow the water to pass to the motor. The electro-magnets are each connected to a wire 73 that is connected in series with the storage battery or other source of energy, and is, also, connected to the hand or pointer 64. One side of the electro-magnet 67 is connected by a wire 74 to the contact 66 and one side of the electro-magnet 68 is connected by a wire 75 to the contact 65. As a result of this, low pressure in the tank 11 will cause the hand or pointer 64 to engage the contact 66 and establish a circuit through the electro-magnet 67 which will move the valve to the position shown in Fig. 2, so that water will pass to the tank 11 and restore the pressure. As the pressure in the tank increases the hand or pointer will move gradually over until it engages the contact 65, whereupon the electro-magnet 68 will be energized and the valve 48 will be moved to cut off the flow of water to the tank 11, and allowing the water to pass to the motor. In this manner the operation of the device may be governed automatically, so that a full supply of water may be maintained in the tank 11, while the motor is run after the tank has been supplied, and the electrical energy is stored in the battery 59 to be used as required for lighting power, or for other purposes. The wires 73, 74, 75 are continued up to the house or other point from which it may be desired to control the operation of the mechanism, and at this point is a switch 77 which may be turned to close the circuit through either one or other of the electro-magnets in order to control the operation of the device independent of the automatic mechanism.

Leading from the storage battery 59 is a working circuit 80 under the control of a switch 81', and said circuit may be employed for lighting, power or other purposes.

Extending from the side of the tank 12 is a small valve casing 81 containing a valve 82 that is held against its seat by the pressure within the tank. Acting on the stem of the valve is a stem 83 that tends to move it to open position. The valve stem 84 extends out through the casing and carries a head 85 that preferably is formed of insulating material. Secured to the casing is a bracket 85 carrying a spring contact 86 that is insulated from the bracket and is disposed in the path of movement of the head 85, so that when the latter moves inward it will force said contact into engagement with the valve casing. At the house or other convenient point is arranged a bell 89 from which extends a wire 90 to the contact 86. The casing is connected by a wire 91 to the battery and to wire 73, and the alarm is connected to said wire by the conductor 92. The arrangement is such that while the apparatus is working and the pressure in the tank is normal, the valve 92 will be held to its seat and the circuit will be broken. When the pressure is reduced from any cause the spring 83 moves the valve inward and head 85 engaging contact 86 moves the latter against the casing 81 and thus completes the circuit and sounds the alarm.

Leading from the top of the tank 11 is a safety valve 93, the escape pipe 94 of the safety valve being continued down to a point near the bottom of the tank in order that when the pressure exceeds the specified limit, water shall be driven out instead of air.

The shaft 95 that connects the turbine and the dynamo is preferably insulated between the motor and the dynamo, and mounted on the shaft are two insulated collecting rings 96 and 97 that are insulated also from the shaft and are connected to the armature winding in the usual manner. The current conducting wires 60—61 are provided with suitable brushes 98 and 99 that bear against these rings; this form of mechanism being typical, and it being understood that the construction of the dynamo may be altered, and any form of collecting mechanism employed. On this shaft is mounted an automatic circuit controlling mechanism for automatically breaking the circuit with the storage battery when the dynamo stops, and for automatically closing the circuit after the dynamo has started into operation. To the shaft, which is electrically connected to the armature winding, is rigidly secured a metallic collar 100, and slidably and revolubly mounted on the shaft is a metallic sleeve 101 having an insulating bushing 102 through which the shaft extends. The ring 96 which is also insulated from the shaft and from the collar 100 is provided with pivot lugs for the reception of the ends of links 103, and the collar 101 has lugs for the reception of links 104. These links are pivotally connected together, and at the point of connection are weights 105 that tend to move outward under the influence of centrifugal force. In moving outward the sleeve 101 is drawn in the direction of the collar 100, and when the sleeve engages with the collar, a circuit is established from the shaft through the collar 100, the sleeve 101, the arms or links 104, 103 to the collecting ring or similar member 96. When the speed of the dynamo lowers, or its operation stops, the weighted arms or links move inward and the sleeve 101 is moved from engagement with the collar 100, so that the circuit is broken. The device is also of value in that it permits the motor to start the dynamo into operation, and thus overcome the inertia of the armature, the dynamo obtaining practically full speed without load, until the speed increases to such an extent that the sleeve 101 will move into engagement with the collar 100.

In the tanks 11 and 12 are arranged threaded openings that are normally closed by plugs 110 and 111, and when it is desired to use the machine as an air compressor, an air pump of ordinary construction is attached to these openings, the water pressure in tank 11 serving to operate the pump, and the tank 12 answering as a reservoir to receive the air compressed by said pump. In this case the air cock between the gage and the tank 11 is closed and the valve 49 is turned in such manner as to permit the delivery of air through the pipe 54 to any suitable point. The valve 48 is disconnected from its electro-magnets and turned in order to close the outlet from the tank 12.

If it is desired to operate for either pumping or operating the motor only, the plug 44 is removed, and in this case both tanks are in direct connection with the pressure chamber of the ram.

It has been found in practice that in order to secure the best results, the supply pipe which leads to the main chamber or drive pipe 18' of the ram should be of the same cubic content as such drive pipe in order to secure the best results, and in carrying out the present invention a pipe 120 is coupled to the entrance end of the drive pipe 18 and to this pipe 120 is connected a supply pipe 121. Between these two pipes is located a gate valve 122.

In carrying out the invention, it is found that the best results are attained when the volume of water discharged through the main escape valve is equal to the entire cubic content of the main drive chamber of the ram. To accomplish this it is, of course, necessary to employ large escape ports, and this is provided for by the ring valve heretofore described. When this quantity of water is discharged, it is, of course, essential to instantly replace it in order to obtain the beneficial results due to the sudden refilling of the ram chamber. To accomplish this, the diameter of the supply pipe should be such that a length of pipe equal to the vertical height of the head of water shall contain the same quantity of water as the drive chamber or a greater quantity. If there is less water than required, the drive chamber will fill more or less gradually and the necessary impact will not be attained.

Having thus described the invention, what is claimed is:—

1. The combination with a hydraulic ram, of a water storage tank, a water motor, and automatic means for controlling communication between the pressure chamber of the ram, the storage tank and the motor.

2. The combination with a hydraulic ram, of a water storage tank, a water motor, a valve for directing the flow of water from the ram to the tank, or to the motor, and a valve operating means controllable by variations in pressure in said tank.

3. The combination with a hydraulic ram, of a water storage tank, a water motor, a valve movable to place the ram in communication with either the tank or the motor, electro-magnets for controlling the position of the valve, and a magnet circuit having terminal contacts under the control of the fluid pressure in the tank.

4. The combination with a hydraulic ram, of a water storage tank, a water motor, a valve for directing the water from the ram to the tank, or to the motor, electro-magnets for controlling the position of the valve, a pressure gage on the tank, and magnet circuits having terminals adjacent to the pressure gage and closable on variations of pressure within the tank.

5. The combination with a hydraulic ram, of a water-motor connected thereto, a magneto generator operable by the water, a water storage tank normally in communication with the ram, and means for automatically diverting the flow of water to the motor when the pressure in the chamber reaches a predetermined point.

6. The combination with a hydraulic ram, of a pair of tanks, one of which is in direct communication with the pressure chamber of the ram, the second tank being employed for the storing of water under pressure, and being connected to the first tank, a water supply pipe leading from the storage tank, and a valve under the control of the pressure in the storage tank for cutting off the flow of water thereto when the pressure reaches a predetermined point.

7. In an apparatus of the class described, the combination with a ram, of a water storage tank, a supply pipe leading therefrom, a water motor, an automatically operated valve for controlling the flow of water to either the storage tank or to the motor, a dynamo connected to the water motor, a storage battery in circuit with the dynamo, and a working circuit leading from the storage battery.

8. In apparatus of the class described, the combination with a hydraulic ram, of a water storage chamber connected thereto, a water motor, a dynamo connected to the moter, a valve for controlling the flow of water to either the storage chamber or the motor, a pair of electro-magnets for controlling the valve, and circuits leading from the electro-magnets and having terminals to permit distant control of the valve.

In testimony that I claim the foregoing as my own, I have hereto affixed my signature in the presence of two witnesses.

EDWARD ROBERT BRODTON.

Witnesses:
N. PHILLIPS,
L. LANCASHIRE.